United States Patent

Vetter et al.

(10) Patent No.: US 9,484,726 B2
(45) Date of Patent: Nov. 1, 2016

(54) FLUID-TIGHT LINE FEEDTHROUGH

(71) Applicant: MAN DIESEL & TURBO SE, Augsburg (DE)

(72) Inventors: Marcel Vetter, Zurich (CH); Benno Zigerlig, Klingnau (CH); Daniel Frehner, Ehrendingen (CH)

(73) Assignee: MAN Diesel & Turbo SE, Augsburg (DE)

( * ) Notice: Subject to any disclaimer, the term of this patent is extended or adjusted under 35 U.S.C. 154(b) by 0 days.

(21) Appl. No.: 14/443,701

(22) PCT Filed: Nov. 25, 2013

(86) PCT No.: PCT/EP2013/074544
§ 371 (c)(1),
(2) Date: May 19, 2015

(87) PCT Pub. No.: WO2014/080001
PCT Pub. Date: May 30, 2014

(65) Prior Publication Data
US 2015/0303668 A1 Oct. 22, 2015

(30) Foreign Application Priority Data

Nov. 23, 2012 (DE) .................. 10 2012 022 837

(51) Int. Cl.
*H02G 3/22* (2006.01)
*H02G 15/013* (2006.01)
*H02G 15/32* (2006.01)
*H01B 17/26* (2006.01)

(52) U.S. Cl.
CPC .............. *H02G 3/22* (2013.01); *H01B 17/26* (2013.01); *H02G 15/013* (2013.01); *H02G 15/32* (2013.01)

(58) Field of Classification Search
CPC .... H02G 15/32; H02G 15/20; H02G 15/013; H02G 3/22; H02G 3/24; H02G 3/26; H01B 17/303; H01B 17/305; H01B 17/30; H01B 17/306; H01B 17/26; H01B 17/06; H01B 17/42; H01B 17/44; H01B 17/46; Y10S 439/935
USPC ............... 174/650, 152 R, 151, 655, 667
See application file for complete search history.

(56) References Cited

U.S. PATENT DOCUMENTS 3,017,452 A 12/1958 Rongved
3,666,878 A * 5/1972 Turner ............... H01B 17/26
174/152 R (Continued)

FOREIGN PATENT DOCUMENTS

DE 699 26 042 5/2006
DE 10 2007 044 348 3/2009

(Continued)

*Primary Examiner* — Dimary Lopez Cruz
(74) *Attorney, Agent, or Firm* — Cozen O'Connor

(57) ABSTRACT

A fluid-tight line feedthrough for introducing an electric conductor into a high-pressure chamber includes a housing and an electric conductor that passes through the housing. A ceramic insulator is positioned between the housing and the electric conductor. The ceramic insulator is divided into a first insulator segment facing the electric conductor and a second insulator segment facing the housing, thereby forming a conical separating plane. A fitting made of an electrically conductive material is positioned between the two segments, the fitting being connected to the two segments and to the housing.

15 Claims, 1 Drawing Sheet

(56) References Cited

U.S. PATENT DOCUMENTS

| | | | | |
|---|---|---|---|---|
| 3,926,774 A | * | 12/1975 | Watson | B01D 17/06 174/11 BH |
| 4,139,724 A | * | 2/1979 | Meiss | H02G 15/04 174/19 |
| 4,174,145 A | * | 11/1979 | Oeschger | H01R 13/521 174/152 GM |
| 4,213,004 A | * | 7/1980 | Acker | H01B 17/305 174/151 |
| 4,296,986 A | | 10/1981 | Herrmann, Jr. | |
| 4,519,662 A | * | 5/1985 | Riley | H01B 17/306 174/18 |
| 4,986,764 A | | 1/1991 | Eaby et al. | |
| 5,580,266 A | | 12/1996 | Shelly | |
| 5,580,273 A | * | 12/1996 | Krieger | H01B 17/303 174/665 |
| 5,626,486 A | | 5/1997 | Shelly et al. | |
| 6,067,395 A | | 5/2000 | Cairns et al. | |
| 6,364,677 B1 | | 4/2002 | Nysveen et al. | |
| 7,772,506 B2 | | 8/2010 | Suter et al. | |
| 2004/0058575 A1 | | 3/2004 | Nicholson | |
| 2005/0186823 A1 | | 8/2005 | Ring et al. | |
| 2007/0292097 A1 | | 12/2007 | Sumitani | |
| 2008/0314616 A1 | | 12/2008 | Benestad et al. | |
| 2011/0021049 A1 | | 1/2011 | Ramasubramanian et al. | |
| 2011/0034066 A1 | | 2/2011 | Jazowski et al. | |

FOREIGN PATENT DOCUMENTS

| | | |
|---|---|---|
| EP | 0041914 A1 | 12/1981 |
| EP | 1675241 A1 | 6/2006 |
| GB | 742801 A | 1/1956 |
| WO | WO 2009/002187 | 12/2008 |
| WO | WO 2010/070439 | 6/2010 |

* cited by examiner

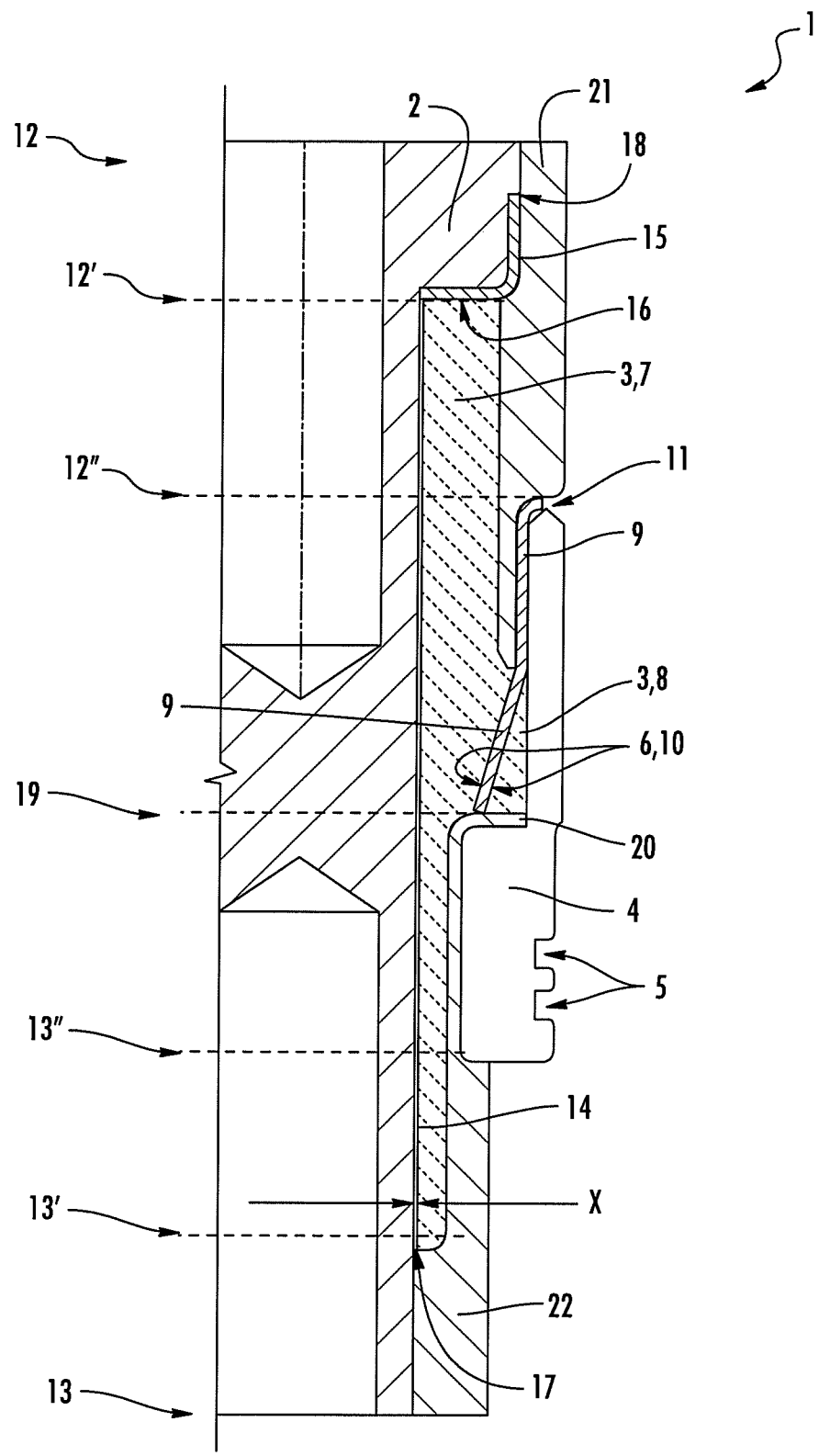

FLUID-TIGHT LINE FEEDTHROUGH

CROSS-REFERENCE TO RELATED APPLICATIONS

This is a U.S. national stage of application No. PCT/EP2013/074544, filed on 25 Nov. 2013, which claims priority to the German Application No. 10 2012 022 837.6, filed 23 Nov. 2012, the content of both incorporated herein by reference.

BACKGROUND OF THE INVENTION

1. Field of the Invention

The invention relates to a fluid-tight line feedthrough.

From practice it is known with the help of a fluid-tight line feedthrough, which is passed through a wall of a pressure vessel, to supply a drive unit positioned within the pressure vessel with electric energy. Accordingly, it is usual, for example, for transporting natural gas with the help of a drive motor positioned in a pressure vessel filled with natural gas to drive a compressor likewise arranged in the pressure vessel in order to compress and, in the process, liquefy the natural gas to be transported via the compressor. For the drive motor, electric energy has to be introduced into the pressure vessel from the outside via an electrical line, while by way of a fluid-tight line feedthrough it is ensured that no natural gas escapes from the pressure vessel into the surrounding area of the pressure vessel.

From EP 1 675 241 A1 a fluid-tight line feedthrough is known, wherein the line feedthrough disclosed in that document comprises a housing that is sealed off relative to the wall of the pressure vessel, and wherein an electrical conductor runs in the housing which serves for supplying a drive unit positioned in the pressure vessel with electric energy.

Although line feedthroughs known up to now ensure a fluid-tight feedthrough of an electrical conductor into a high-pressure chamber to a certain degree for supplying an electrical consumer positioned in a high-pressure chamber with electric energy, these known line feedthroughs have a many' disadvantages.

Accordingly, fluid-tight line feedthroughs known up to now have the disadvantage that undesirable electrical part discharges or electrical flashovers can occur, which impair functional safety. Furthermore, fluid-tight line feedthroughs known up to now have the disadvantage that they allow, to a certain degree, a permeation of gases (for example oxygen, hydrogen, helium, carbon dioxide, nitrogen, hydrocarbons and trace gases), whereby the tightness of the line feedthrough is limited. Further leakages can form through mechanical and thermal stresses between the individual assemblies of the line feedthrough. Furthermore, there is the problem in the case of fluid-tight line feedthroughs known from practice that upon a mechanical failure of the line feedthrough individual assemblies, such as, for example, the electrical conductor may detach and because of the high pressure in the high-pressure chamber can enter the surrounding area in a projectile-like manner.

SUMMARY OF THE INVENTION

In view of this, it is an object of the present invention to create a new type of line feedthrough. This object is solved through a line feedthrough in which a ceramic insulator is positioned between the housing and the electrical conductor, wherein the ceramic insulator subject to forming a conical separating plane is divided into a first insulator segment facing the electrical conductor and into a second insulator segment facing the housing, and wherein between the two segments a fitting of an electrically conductive material is positioned, which is connected to the two segments and the housing.

Because of the fact that the line feedthrough according to the invention comprises the ceramic insulator divided in two, the separating plane of which is conically contoured between the two insulator segments, the function requirements regarding electrical insulation of the line feedthrough and regarding the tightness relative to the medium that is present in the high-pressure chamber can be functionally separated and fulfilled at the same time.

A ceramic insulator prevents permeation of gases through the line feedthrough and therefore has better sealing characteristics. Separating the ceramic insulator into the two insulator segments subject to forming the conical separating plane additionally results in optimal introduction of the mechanical pressure onto the housing of the line feedthrough. The conical contouring of the separating surface of the two insulator segments in combination with the fitting of the electrically conductive material positioned between the two segments sandwich-like additionally provides optimal electric field line guidance in the line feedthrough, as a result of which electrical part discharges or electrical flashovers can be avoided.

Accordingly, the line feedthrough according to the invention avoids the disadvantages of the prior art.

According to an advantageous further development, a gap in an order of magnitude between 0.01 mm to 0.1 mm, in particular in an order of magnitude between 0.03 mm to 0.05 mm is formed between the first insulator segment facing the electrical conductor and the electrical conductor.

By adjusting such a defined gap between the electrical conductor and the insulator, thermal stresses caused by different heat expansions of the respective components of the line feedthrough and mechanical stresses can be avoided.

Preferentially, the first insulator segment facing the electrical conductor is metallized on an inner surface facing the electrical conductor.

Furthermore, electrical part discharges in the gap can thereby be prevented in particular in combination with the metallizing of the inner surface of the first insulator segment facing the electrical conductor.

These part discharges can ultimately lead to an electrical flashover.

According to a further advantageous development, the electrical conductors, the ceramic insulator and the housing have stepped diameters. The electrical conductor has a larger outer diameter on a section on the high-pressure chamber side section than on a high-pressure chamber side section than on a low-pressure chamber side section in such a manner that the high-pressure chamber side section of the electrical conductor engages behind a high-pressure chamber side section of the ceramic insulator. On a high-pressure chamber side section the housing has a larger inner diameter than on a low-pressure chamber side section in such a manner that the low-pressure chamber side section of the housing engages behind a middle section of the ceramic insulator.

This stepping of the diameters of electrical conductor, ceramic insulator and housing ensures that upon a mechanical failure of the line feedthrough none of the components or assemblies of the line feedthrough enter the surrounding area in a projectile-like manner. The housing, in the case of a mechanical failure of the line feedthrough, rather keeps both the ceramic insulator and also the electrical conductor in position.

According to a further advantageous development, a first casting compound, which has a very good chemical resistance, high temperature resistance, high elasticity following setting and high dielectric strength is on the high-pressure chamber side end wherein the first casting compounding surrounds the ceramic insulator and the electrical conductor in sections. Recommended is the use of a first casting compound (for example epoxy resin or polyurethane) with a charge of a powdery inorganic insulator system (for example $Al_2O_3$ or $TiO_2$). On the low-pressure chamber side end there is provided a second casting compound (for example silicon) with the characteristics of high temperature resistance, high elasticity after the setting and high dielectric strength, wherein the second casting compound surrounds the ceramic insulator and the electrical conductor in sections.

The use of the first casting compound on the high-pressure chamber side end and the use of the second casting compound on the low-pressure chamber side end of the line feedthrough improves the tightness of the line feedthrough.

BRIEF DESCRIPTION OF THE DRAWING

Preferred further developments of the invention are obtained from the following description. Exemplary embodiments of the invention are explained in more detail with the help of the drawing without being restricted to this. In the drawing:

The FIGURE shows a schematic cross section through a line feedthrough according to the invention.

DETAILED DESCRIPTION OF THE PREFERRED EMBODIMENTS

The present invention relates to an electrical line feedthrough that feeds an electrical conductor through a wall of a pressure vessel, wherein the wall of the pressure vessel separates a low-pressure chamber or the surrounding area outside the pressure vessel from a high-pressure chamber within the pressure vessel. By way of the line feedthrough an electrical consumer, such as for example an electric drive positioned in the pressure vessel can be supplied with electric energy.

The FIGURE shows an extract of a cross section through an exemplary embodiment of a fluid-tight line feedthrough 1 according to the invention, which serves for feeding an electrical conductor 2 through a wall of a pressure vessel separating the low-pressure chamber or the surrounding area and the high-pressure chamber, wherein the electrical conductor 2 radially outside is surrounded in sections by an electrical insulator 3, and wherein the electrical insulator 3 radially outside is surrounded in sections by a housing 4 of the line feedthrough 1.

Via the housing 4, the electrical line feedthrough 1 can be inserted into the wall of the pressure vessel, wherein grooves 5 in the housing 4 serve for receiving sealing rings in order to seal the housing 4 of the line feedthrough 1 relative to the wall of the pressure vessel.

The insulator 3, which is positioned between the housing 4 and the electrical conductor 2, is embodied as a ceramic insulator, preferentially from an aluminium oxide ceramic. Such a ceramic insulator 3 prevents a permeation of gases, in particular of hydrocarbons and trace gases, such as for example $H_2S$ and Hg, so that there is no danger that as a result of permeation such gases, starting out from the high-pressure chamber of the pressure vessel enter the region of the low-pressure chamber or the surrounding area of the pressure vessel.

The ceramic insulator is divided into two insulator segments subject to forming a conical separating plane 6, namely into a first insulator segment 7, facing the electrical conductor 2, and into a second insulator segment 8, facing the housing 4. Between these two insulator segments 7 and 8 extends a fitting 9 of an electrically conductive material at least in the region of this separating plane 6. Preferentially, this fitting 9 is produced from copper or a copper alloy.

By way of the separation of the ceramic insulator 3 into the two insulator segments 7 and 8 subject to forming the conical separating plane 6 it is possible to optimally introduce the pressure acting on the insulator 3 and/or electrical conductor 2 on the housing 4. The line feedthrough 1 accordingly allows a good mechanical pressure introduction on the housing 4 and is therefore insensitive to mechanical stresses or loads.

The fitting 9 extending in the region of the conical separating plane 6 between the two insulator segments 7 and 8 is reduced sandwich-like between the insulator segments 7 and 8, wherein this fitting 9 of the electrically conductive material received sandwich-like between the insulator segments 7 and 8 ensures electric field line guidance, which, taking into account peripheral conditions of high-voltage technology, avoids electrical part discharges and electrical flashovers. In particular in the region of the ceramic insulator optimal field line guidance is ensured.

Separating surfaces 10 of the two insulator segments 7 and 8 of the ceramic insulator 3, which define the conical separating plane 6, are metallized, i.e., provided with a metallic coating wherein the fitting 9 of the electrically conductive material is connected by soldering to the ceramic insulator 3 via the metallized separating surfaces 10 of the two insulator segments 7 and 8. This ensures an optimal connection of the fitting 9 to the two insulator segments 7 and 8 of the ceramic insulator 3, namely subject to avoiding mechanical and thermal stresses as a consequence of the connection. Because of this, the fluid-tight line feedthrough 1 accordingly becomes insensitive to thermal alternating stresses and mechanical stresses.

The fitting 9 extends between the two insulator segments 7 and 8 not only in the region of the separating plane 6 but also with a section outside this separating plane 6, wherein the section of the fitting 9 extending outside the separating plane 6 is connected to a section of the housing 4 by welding, namely by forming a weld seam 11. This welded connection 11 between the fitting 9 and the housing 4 is effected in the region of a high-pressure chamber side end of the housing 4.

In the FIGURE, a high-pressure chamber side end of the line feedthrough 1 is marked with the reference number and a low-pressure chamber side end of the line feedthrough 1 with the reference number 13.

The high-pressure chamber side end 12 of the line feedthrough 1 in this case coincides with the high-pressure chamber side end of the electrical conductor 2. The low-pressure chamber side end 13 of the line feedthrough 1 coincides with the low-pressure chamber side end of the electrical conductor 2.

A high-pressure chamber side end 12' of the ceramic insulator 3 and a low-pressure chamber side end 13' of the ceramic insulator 3 are each set back relative to the high-pressure chamber side end 12 and the low-pressure chamber end side 13 of the electrical conductor 2, so that accordingly the electrical conductor 2 protrudes relative to the ceramic insulator 3 on both sides. Likewise, the high-pressure chamber side 12" of the housing 4 and the low-pressure chamber side end 13" of the housing 4 are set back respectively relative to the high-pressure chamber side end 12' of the ceramic insulator 3 and relative to the low-pressure chamber side end 13' of the ceramic insulator 3, so that accordingly the ceramic insulator 3 protrudes relative to the housing 4 on both sides.

Preferentially, a gap 17 with a defined gap dimension X is formed between the first insulator segment 7 of the ceramic insulator 3 facing the electrical conductor 2 and the electrical conductor 2, which is of an order of magnitude between 0.01 mm and 0.1 mm, in particular of an order of magnitude between 0.03 mm and 0.05 mm.

The ceramic insulator, namely the first insulator segment 7 of the same facing the electrical conductor 2 is metallized, i.e., metallically coated on an inner surface 14 facing the electrical conductor 2. Because of this, in particular thermal stresses as a consequence of thermal alternating loads are avoided, while on the other hand the field line guidance of the electric field lines can be improved because of this.

According to an advantageous further development of the invention, the electrical conductor 2, the ceramic insulator 3 and the housing 4 have stepped diameters. The electrical conductor 2 has a larger outer diameter on a high-pressure chamber side section than on a low-pressure chamber side section, namely in such a manner that the high-pressure chamber side section of the electrical conductor 2 engages behind a high-pressure chamber side section of the ceramic insulator 3.

Accordingly, it is evident from the FIGURE that this diameter stepping of the outer diameter of the electrical conductor 2 takes place in the region of the high-pressure chamber side end 12' of the ceramic insulator 3, wherein in this region between the electrical conductor 2 and the ceramic insulator 3 a further fitting 15 of an electrically conductive material is positioned.

This further fitting 15 of an electrically conductive material is angled L-shaped in cross section, wherein a face of the ceramic insulator 3 facing the further fitting 15 is metallized on the high-pressure chamber side end 12' of the same in order to provide a good connection between the ceramic insulator 13 and the further fitting 15 through soldering, which, like the soldered connection between the fitting 9 and the two insulator segments 7 and 8 in the region of the conical separating surface 6, is insensitive to thermal alternating stresses.

As already explained, the fitting 9 is not only connected in the region of the conical separating surface 6 by soldering to the two insulator segments 7 and 8 of the ceramic insulator 3 but also by welding to the housing 4 in the region of the high-pressure chamber side end 12' of the housing 4.

Likewise, the further fitting 15 is not only connected to the first insulator segment 7 of the ceramic insulator 3 through soldering but additionally by welding to the electrical conductor 2, wherein in the FIGURE the welded connection between the electrical conductor 2 and the further fitting 15 is marked by a reference number 18.

The welded connection 18 between the electrical conductor 2 and the further fitting 15 accordingly takes place in the region of the high-pressure chamber side section of the electrical conductor 2 with the greater outer diameter.

Furthermore, the housing 4 has a stepped diameter, wherein the housing 4 on a high-pressure chamber side section has a larger inner diameter than on a low-pressure chamber side section. This diameter stepping of the inner diameter of the housing 4 takes place in the region of a middle section 19 of the ceramic insulator 3 or of the housing 4, wherein the low-pressure chamber side section of the housing 4 engages behind a middle section 19 of the ceramic insulator 3 with the smaller inner diameter.

Between the corresponding surfaces of ceramic insulator and housing 4 an element 20 of an electrically conductive material is arranged, the task of which is to offset surface irregularities between the housing 4 and the insulator 3 so that no impermissible mechanical stresses occur in the insulator 3.

Through the above stepping of the diameters of electrical conductor 2, ceramic insulator 3 and housing 4 it is ensured that upon a mechanical failure of the line feedthrough 1 both the electrical conductor 2 as well as the ceramic insulator 3 are each held in their position and due to the high pressure in the high-pressure chamber cannot enter the surrounding area in a projectile-like manner and injure persons present in the surrounding area or damage objects positioned in the surrounding area.

In addition to the already mentioned electrical conductor 2, ceramic insulator 3, the housing 4, the two fittings 9 and 15 and the element 20 of an in each case electrically conductive material, the line feedthrough 1 comprises two casting compounds, namely a first casting compound 21 (for example of an epoxy resin) on the high-pressure chamber side end, wherein this first casting compound 21 surrounds the ceramic insulator 3 and the electrical conductor 2 in sections at the high-pressure chamber side end 12 and 12' respectively radially on the outside. A second casting compound 22 (for example of a silicon) is positioned on the low-pressure chamber side end and surrounds the ceramic insulator 3 and the electrical conductor 2 on the low-pressure chamber side end 13 and 13' respectively in sections.

The first casting compound 21 in the region of the high-pressure chamber side end has a good chemical resistance, high temperature resistance, low volume shrinkage, low water solubility and a high dielectric strength. The second casting compound 22 on the low-pressure chamber side end has a high temperature resistance, low viscosity and high dielectric strength.

As already explained above, the stepped diameters of electrical conductor 2, ceramic insulator 3 and housing are advantageous in order to keep the individual assemblies of the line feedthrough in position in the event of a mechanical failure of the line feedthrough in order to thereby avoid that individual assemblies, due to the high pressure prevailing in the high-pressure chamber enter the surrounding area in an uncontrolled projectile-like manner.

A further advantage of the line feedthrough according to the invention is that as a consequence of its design embodiment it is only exposed to low stresses, in particular shear stresses, since both mechanical loads as well as thermal loads are kept low.

Accordingly, the welding of the fittings 9 and 15 to the housing 4 and the electrical conductor 2 respectively takes place in a low-stress and materially joined manner, while the materially joined connection of the fitting 9 to the steel sleeve takes place on the top and side of the fitting and additionally to the electrical conductor 2.

The welding preferentially takes place subject to using a reduced argon atmosphere via laser welding in order to prevent oxidation. The forming of so-called blowholes and other welding defects during the forming of the welded connections 11 and 18 between the fittings 9, 15 and the housing 4 and the electrical conductor 2 respectively can be avoided. The welded connections 11 and 15 are characterized by a high tightness and low leakage rates relative to gases (usually smaller $1*10^{-9}$ millibar/$sic^{-1}$ for example for helium).

The soldered connection between fitting 9 and the insulator 3 as well as the soldered connection between the further fitting 15 and the insulator 3 takes place via suitably metallized surfaces in the region of the ceramic insulator 3, as a result of which mechanical stresses during the connection of the corresponding individual parts of the line feedthrough 1 can likewise be avoided. The soldering is effected under high vacuum. Here, air inclusions or gassing-out on the components to be joined by soldering can be avoided.

The soldered connections and the welded connections are characterized by a high tightness and low leakage rates with respect to gas permeation.

Casting with the casting compounds 21 and 22 likewise takes place under vacuum, as a result of which air bubbles in the casting compounds can be avoided. Furthermore it is ensured that the respective casting compound 21, 22 can enter also narrow passages between the housing 4 and the ceramic insulator 3 and narrow passages between the fitting and the ceramic insulator 3. This, furthermore, has an advantageous influence on the electric field line guidance since air bubbles, which have a negative effect on electric field line guidance, are avoided.

Furthermore, the line feedthrough 1 according to the invention is characterized by optimal electric field line guidance with the help of which electrical part discharges and electrical flashovers can be avoided. In this connection, the conical separating plane 6 between the two insulator segments 7 and 8 and the sandwich-like positioning of the fitting 9 in the region of the separating plane 6 between the two insulator segments 7 and 8 is important on the one hand. Because of this, optimal field line guidance in the ceramic insulator 3 can be ensured.

The ceramic insulator 3 preferentially consists of an aluminium oxide ceramic. The electrical conductor 2 preferentially consists of copper. The housing 4 preferentially consists of stainless steel. The armatures 9 and 15 preferentially consist of copper or a copper alloy. When producing the soldered connections a eutectic Ac/Cu solder is preferentially employed. The element 20, like the two fittings 9 and 15, preferentially consists of copper or a copper alloy. The choice of the materials for the individual assemblies of the line feedthrough according to the invention is made in such a manner that mechanical stresses and thermal stresses in the line feedthrough 1 are minimal. The mechanical mounting of the ceramic insulator through the element 20 on the housing 4 and of the two fittings 9, 15 prevent impermissible tensile stresses on the ceramic insulator 3, which can occur because of mechanical and thermal alternating loads.

Preferentially, all components that are made of copper, i.e., the electrical conductor 2, the fittings 9 and 15 and the element 20, are coated with nickel. Because of this, the corrosion resistance of these assemblies and thus of the fluid-tight line feedthrough 1 can be improved. This coating of the copper components with nickel is effected at least on the surfaces which can directly or indirectly come into contact with the gaseous medium in the high-pressure chamber of the pressure vessel.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fluid-tight line feedthrough for introducing an electrical conductor (2) into a high-pressure chamber, comprising:
    a housing (4);
    the electrical conductor (2) arranged so as to penetrate the housing (4);
    a ceramic insulator (3) positioned between the housing (4) and the electrical conductor (2), the ceramic insulator (3) being subdivided into:
        a first insulator segment (7) facing the electrical conductor (2), and
        a second insulator segment (8) facing the housing (4);
    the ceramic insulator (3) being subdivided so as to form a conical separating plane (6) into the first insulator segment (7) and the second insulator segment (8); and
    a fitting (9) of an electrically conductive material positioned between the first and second insulator segments (7, 8), the fitting (9) being connected to the first and second insulator segments (7, 8) and to the housing (4), at least a portion of the fitting (9) being sandwiched between the first and second insulator segments (7, 8).

2. The line feedthrough according to claim 1, wherein the ceramic insulator (3) has insulator separating surfaces (19), the line feedthrough further comprising metallized separating surfaces (10) of the conical separating plane (6), the metallized separating surfaces (10) and the fitting (9) being connected to the insulator separating surfaces (19) by soldering.

3. The line feedthrough according to claim 2, wherein the fitting (9) is connected to the housing (4) by welding.

4. The line feedthrough according to claim 3, wherein a gap (17) is provided between the first insulator segment (7) facing the electrical conductor (2) and the electrical conductor (2), the gap (17) being of an order of magnitude between 0.01 mm to 0.1 mm.

5. The line feedthrough according to claim 3, wherein a gap (17) is provided between the first insulator segment (7) facing the electrical conductor (2) and the electrical conductor (2), the gap (17) being of an order of magnitude between 0.03 mm to 0.05 mm.

6. The line feedthrough according to claim 1, wherein the first insulator element (7) is metallized on an inner face (14) facing the electrical conductor (2).

7. The line feedthrough according to claim 1, wherein the electrical conductor (2), the ceramic insulator (3) and the housing (4) have stepped diameters.

8. The line feedthrough according to claim 7, wherein the electrical conductor (2) on a high-pressure chamber side section of the line feedthrough has a larger outer diameter than on a low-pressure chamber side section of the line feedthrough, such that the high-pressure chamber side section of the electrical conductor (2) engages on the high-pressure chamber side behind a high-pressure chamber side section of the ceramic insulator (3) and the housing (4) on a high-pressure chamber side section has a greater inner diameter than on a low-pressure chamber side section such that the low-pressure chamber side section of the housing (4) engages on the low-pressure chamber side behind a middle section of the ceramic insulator (3).

9. The line feedthrough according to claim 8, further comprising a further fitting (15) of an electrically conductive material positioned between the high-pressure chamber side section of the electrical conductor (2) and the high-pressure chamber side section of the ceramic insulator (3), the further fitting (15) being connected to the ceramic insulator (3) and to the electrical conductor (2).

10. The line feedthrough according to claim 9, wherein the ceramic insulator (3) is metallized on a face (16) facing the further fitting (15), and the further fitting (15) is connected to this face (16) of the ceramic insulator (3) by soldering.

11. The line feedthrough according to claim 10, wherein the further fitting (15) is connected to the electrical conductor (2) by welding.

12. The line feedthrough according to claim 11, further comprising an electrically conductive element (20) positioned between the low-pressure chamber side section of the housing (4) and the middle section of the ceramic insulator.

13. The line feedthrough according to claim 9, wherein at least one selected from the group consisting of the fitting (9) and the further fitting (15) consists of a copper material.

14. The line feedthrough according to claim 1, further comprising a first casting compound (21) of an epoxy resin on the high-pressure chamber side end, wherein the first casting compound (21) surrounds the ceramic insulator (3) and the electrical conductor (2) in sections.

15. The line feedthrough according to claim 14, further comprising a second casting compound (22) of a silicon on the low-pressure chamber side end, wherein the second casting compound (22) surrounds the ceramic insulator (3) and the electrical conductor (2) in sections.

* * * * *